Patented July 6, 1954

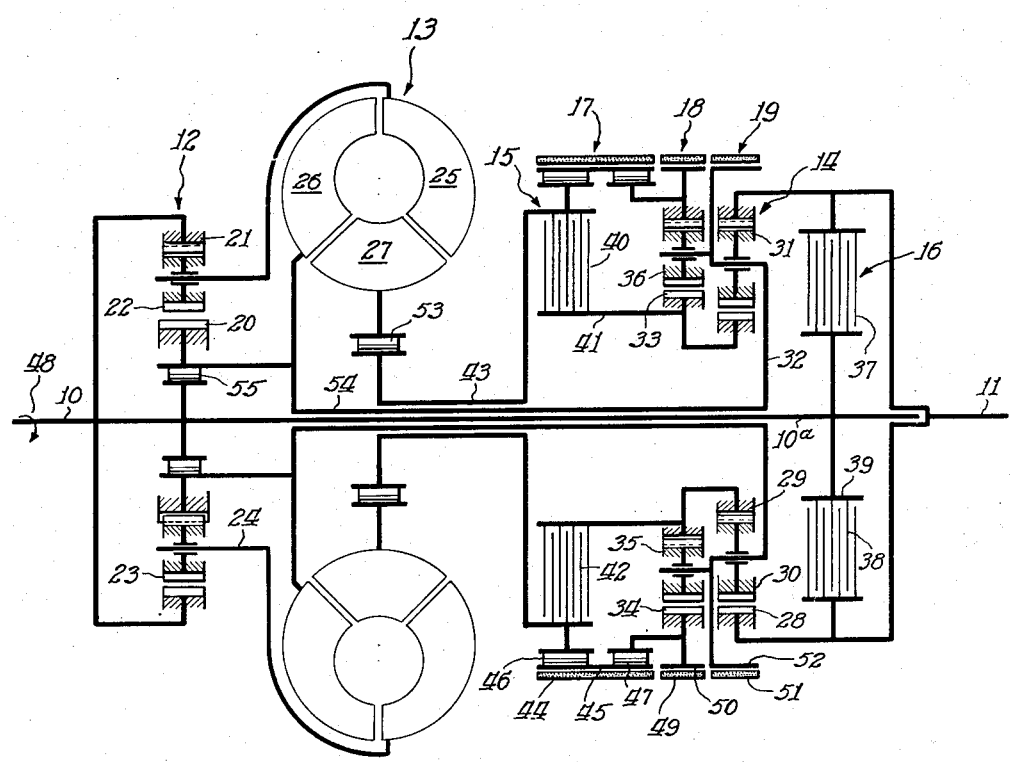

2,682,786

UNITED STATES PATENT OFFICE 2,682,786

TRANSMISSION

George E. Flinn, Muncie, Ind., assignor to Borg-Warner Corporation, Chicago, Ill., a corporation of Illinois Application October 2, 1948, Serial No. 52,487

7 Claims. (Cl. 74—732)

My invention relates to transmissions particularly adapted for use in automotive vehicles and more specifically to such transmissions which comprise hydraulic torque converters.

It is an object of the present invention to provide an improved transmission comprising a torque converter which provides three speeds in forward drive and a reverse drive with the highest speed in forward drive being exclusive of the hydraulic torque converter and the other drives being through the converter.

It is another object of the invention to provide such a transmission which is so constructed that each of the upshifts may be made by engagement of a single friction engaging means, more particularly, a friction brake or a friction clutch, which constitutes power shifting the transmission. To this end it is an object of the invention to provide one-way engaging means in each of the two lower speeds of a three speed transmission which disengage when the transmission is driving in its high speed ratio.

It is a further object of the invention to provide such a transmission which is so constructed as to give a reduced speed ratio coasting gear so that the driven shaft of the transmission may drive the drive shaft thereof without any of the one-way engaging mechanisms in the transmission functioning to break such a drive. It is a more specific object to provide means for bridging the hydraulic torque converter in the coast drive ratio so that this drive is exclusive of the torque converter.

The invention consists of the novel constructions, arrangements and devices to be hereinafter described and claimed for carrying out the above stated objects and such other objects as will appear from the following description of a preferred embodiment of the invention which is illustrated in the accompanying drawing in which the figure shows schematically a transmission embodying the principals of the invention.

Referring now to the accompanying drawing, the illustrated transmission comprises a drive shaft 10 and a driven shaft 11. The transmission is adapted to be used in an automotive vehicle, and the drive shaft may be connected with the driving engine (not shown) of the vehicle, and the driven shaft 11 may be connected with the driven wheels (not shown) of the vehicle.

The transmission comprises in general a planet gear set 12, a hydraulic torque converter 13, a planet gear set 14, a friction clutch 15, a friction clutch 16, a low speed friction brake 17, a lock-up brake 18, and a reverse friction brake 19.

The planet gear set 12 comprises a sun gear 20, a ring gear 21, inter-meshing planet gears 22 and 23, and a planet gear carrier 24. As shown, the planet gears 22 mesh with the ring gear 21, and the planet gears 23 mesh with the sun gear 20.

The hydraulic torque converter 13 comprises a bladed impeller element 25, a bladed runner element 26, and a bladed stator element 27. The torque converter is constructed in accordance with well-known practice with the blades of the elements 25, 26 and 27 in a common fluid circuit so that when the impeller element 25 is driven, the runner element 26 is driven by means of the fluid which is circulated by rotation of the impeller, and the stator 27 functions to change the direction of flow of the fluid so that the runner element 26 is driven at a greater torque than is impressed on the impeller element 25.

The planet gear set 14 comprises a ring gear 28, a sun gear 29, a planet gear 30 in mesh with the sun gear, a planet gear 31 in mesh with the other planet gear and also with the ring gear, and a planet gear carrier 32. The planet gear set comprises also a second sun gear 33 connected with the sun gear 29, a ring gear 34, a planet gear 35 in mesh with the sun gear 33 and a planet gear 36 in mesh with the other planet gear 35 and also with the ring gear 34. The planet gears 35 and 36 are disposed along with the planet gears 30 and 31 on the planet gear carrier 32.

The clutch 16 comprises friction clutch plates 37 connected with the driven shaft 11 and ring gear 28 as shown and plates 38 disposed on a hub portion 39 which is fixed to an extension 10a of the drive shaft 10.

The friction clutch 15 comprises a plurality of friction plates 40 fixed to a sleeve shaft 41 connected with the sun gears 29 and 33 and a plurality of interleaved friction clutch plates 42 connected with a sleeve shaft 43. Both of the friction clutches 15 and 16 may be engaged by any suitable means, such as by fluid pressure operated pistons (not shown).

The brake 17 comprises a brake band 44 adapted to engage a brake drum 45. A one-way roller brake unit 46 is provided between the drum 45 and the sleeve shaft 43 and another one-way roller brake unit 47 is provided between the drum 45 and the ring gear 34. The one-way brake unit 46 prevents a reverse rotation of the sleeve shaft 43, and the one-way brake unit 47 prevents a reverse rotation of the ring gear 34 with respect to the brake drum 45, a reverse direction of rotation being considered to be opposite to that in which the drive shaft 10 is driven as indicated by the arrow 48. The roller brakes 46 and 47 may be of well-known construction.

The friction brake 18 comprises a brake band 49 acting on a brake drum 50 which is connected to the ring gear 34. The friction brake 19 comprises a brake band 51 adapted to act on a brake drum 52 that is connected with the planet gear carrier 32.

The stator 27 of the torque converter 13 is supported by the sleeve shaft 43, and a one-way engaging unit 53 is provided between the stator and shaft. The unit 53 is of the usual construction and is so arranged as to prevent a reverse rotation of the stator 27 with respect to the sleeve shaft 43.

A sleeve shaft 54 coaxial with the drive shaft extension 10a and disposed thereover is provided for connecting the sun gear 20, the runner 26, and the planet gear carrier 32. A one-way engaging unit 55, which may be of well-known construction, is provided between the drive shaft extension 10a and the sleeve shaft 54, and this one-way engaging unit is so arranged as to prevent the sleeve shaft 54 from rotating faster in the forward direction than the drive shaft extension 10a for purposes hereinafter to be described.

The illustrated transmission provides low, intermediate and high speeds in forward drive and a drive in reverse. The low and intermediate ratio drives are of the free wheeling type, and a two-way low speed drive is therefore also provided for selectively connecting the shafts 10 and 11.

The low speed forward drive power train is completed by engaging the friction brake 17. The brake drum 45 acts through the free wheeling unit 47 to hold the ring gear 34 against reverse rotation so that the ring gear acts as a reaction member for the planet gear set 14. The brake drum 45 acts through the free wheeling unit 46 and the sleeve shaft 43 and free wheeling unit 53 to hold the stator 27 of the torque converter 13 against reverse rotation so that the stator is effective to cause torque multiplication through the converter 13. When the shaft 10 is rotated, the planetary unit 12 causes its carrier 24 to rotate at an increased speed wfith respect to that of the shaft 10, and the impeller 25 rotates along with the carrier 24. Since the stator 27 is held stationary by means of the brake 17, the runner 26 of the converter 13 is driven by the impeller 25 at an increased torque, and the sleeve shaft 54 is driven by the runner 26. As the runner 26 and sleeve shaft 54 increase in speed, the speed differential between the drive shaft 10 and the impeller 25 decreases so that eventually the parts of the planetary gear set 12 rotate very nearly at the same speed, as do the runner 26 and impeller 25 of the torque converter 13. When this speed of the runner 26 is reached, the stator 27 begins also to rotate in the forward direction and is released by the one-way engaging unit 53, in accordance with well-known principles of operation of such converters.

The planetary gear set 14 has its ring gear 34 held stationary by the brake 17, and the gear set drives its ring gear 28 and thereby the driven shaft 11 connected therewith at a reduced ratio with respect to the sleeve shaft 54 which constitutes the drive shaft for the gear set 14. The increase in ratio between the shafts 10 and 11 is thus the product of the torque ratios provided by the converter 13 and gear set 14.

Intermediate speed drive through the transmission is provided by engaging the friction clutch 15, with the brake 17 remaining engaged. This engagement of the clutch 15 has the effect of holding the sleeve shaft 41 and thereby the sun gear 29 stationary through the free wheeling unit 46 and brake 17 so that the ring gear 28 and thereby the driven shaft 11 will be driven at a higher speed ratio with respect to the sleeve shaft 54, the drive in this case being solely through that part of the planetary gear set comprising the sun gear 29, the planet gears 30 and 31 and the ring gear 28. It will be apparent that the friction engaging unit 15, which has heretofore been described as a clutch and functions as one as will be hereinafter described, in this particular instance functions as a brake. The intermediate speed ratio between the shafts 10 and 11 is thus the product of the torque multiplication through the torque converter 13 and that through this part of the gear set 14, and the drive is a free wheeling drive since the one-way engaging unit 46 functions along with the brake 17 to render the sun gear 29 the reaction member for the gear set 14. If a sufficient speed of the driven shaft 11 has been obtained by the time a shift from low speed ratio to intermediate speed ratio is made, the parts of the torque converter 13 in this case will be rotating at a 1–1 ratio, and the torque between the shafts 10 and 11 will thus be solely that derived from the gear set 14. As has been explained, the low speed drive through the transmission is also a free wheeling drive, and hence it is possible to shift from the low speed drive to the intermediate speed drive simply by engaging the friction clutch unit 15 while the brake 17 engaged for the low speed drive remains engaged. The low speed drive is broken in this case by the one-way engaging unit 47 which overruns.

A shift into high speed drive is obtained by engaging the friction clutch 16 while allowing the friction clutch 15 and friction brake 17 to remain engaged. The drive in this case is directly from the shaft 10 to the shaft 11 through the friction clutch 16. Since the one-way engaging unit 46 functions to hold the sun gear 29 stationary for providing the intermediate speed drive, this one-way engaging unit overruns when the clutch 16 is engaged in order to break the intermediate speed drive between the shafts. It is noteworthy that, in contrast with the low and intermediate speed drives each of which includes the torque converter 13, the direct drive through the transmission is exclusive of the torque converter and proceeds directly from the drive shaft to the driven shaft. Hence any power loss which might occur in the converter 13 is not had in direct drive.

A reverse drive through the transmission is obtained by engaging the friction brake 19 and the friction clutch 15. The torque converter 13 tends to drive the sleeve shaft 54 as before; however, the brake 19 is effective on the planet gear carrier 32 and thereby on the sleeve shaft 54 connected therewith so that the runner 26 is held stationary. The reaction on the stator 27 is in the reverse direction, that is, in the direction reverse to the arrow 48, and the stator is thereby rotated in this reverse direction. Such rotation of the stator is transmitted through the one-way engaging unit 53, the sleeve shaft 43, the clutch 15, the sleeve shaft 41, to the sun gear 29 and the reverse rotation of the sun gear 29 is transmitted through the gears 30, 31 and 28 to the driven shaft 11 for rotating the driven shaft in the reverse direction. The torque ratio of this reverse drive is increased by these gears of the planet gear set as is apparent.

A two-way reduced ratio lock-up drive is provided between the shafts 10 and 11 by engaging the brakes 17 and 18. The drive in this case from the shaft 10 to the shaft 11 is the same as in low speed forward drive with the exception that the ring gear 34 is held stationary by means of the brake 18 in addition to the free wheeling unit 47 and brake 17. The brake 17 functions as before to hold the stator 27 stationary through the free wheeling units 46 and 53, so that the torque converter 13 provides an increased torque drive when the shaft 10 is being driven by the vehicle engine. The sleeve shaft 54 is coupled in a two-way drive with the shaft 11, since the brake 49 is utilized for holding the ring gear 34 against rotation in both directions, and the one-way engaging unit 55 functions to drive the drive shaft 10 in the forward direction along with the sleeve shaft 54 exclusive of the converter assuming that the vehicle is coasting while the engine of the vehicle is idling or inoperative. With the transmission being thus conditioned, the vehicle engine acts as a brake on the vehicle or the engine may drive the vehicle.

My improved transmission advantageously provides three speeds in forward drive, two of which include the hydraulic torque converter. Each of the two lower speeds includes one-way engaging units therein so that in order to shift to the next higher speed from either lower ratio, it is simply necessary to engage a single friction engaging unit, and it is not necessary to disengage another such unit simultaneously. The transmission advantageously provides a direct drive which is independent of the torque converter, and any inefficiencies of such a converter are not thus present in the high speed drive in which the vehicle is driven most of the time. Since both of the lower speed ratios include a one-way engaging unit, the transmission advantageously provides also a coasting gear ratio which provides a drive from the driven shaft 11 to the drive shaft 10 that is positive in nature and is exclusive of any one-way engaging units or of the torque converter 13. The lock-up friction brake 18 provides the positive type of drive between the shaft 11 and the sleeve shaft 54, and the one-way engaging unit 55 provides such a drive between the sleeve shaft 54 and the drive shaft 11.

I wish it to be understood that my invention is not to be limited to the specific constructions, arrangements and devices illustrated and described, except only insofar as the claims may be so limited, as it will be apparent to those skilled in the art that changes may be made without departing from the principles of the invention. With respect to the transmission described herein which is illustrated schematically, it will be understood that any person skilled in the art can be expected to be able to add the necessary mechanical accessories, such as bearings, and to supply details of the parts to be used in the transmission without the exercise of invention, and such constructions are considered within the scope of the invention.

I claim:

1. In a transmission, the combination of a drive shaft, a driven shaft, a hydraulic torque converter driven by said drive shaft, gearing providing a first reduced speed ratio and connectible in series with said torque converter for providing a low speed ratio between said shafts, said gearing including a portion providing a second reduced speed ratio with said portion being connectible in series with said torque converter for providing an intermediate speed ratio between said shafts, each of said low and intermediate speed ratios including one-way engaging means and friction engaging means for completing the ratios, and means for directly connecting said shafts exclusive of said converter to provide a direct drive therebetween and including a friction clutch for completing the drive.

2. In a transmission, the combination of a drive shaft, a driven shaft, a hydraulic torque converter driven by said drive shaft, planetary gearing providing a first reduced speed ratio and connectible in series with said converter for providing a low speed ratio between said shafts, said planetary gearing including a portion providing a second reduced speed ratio with said portion being connectible in series with said torque converter for providing an intermediate speed ratio between said shafts, each of said two reduced speed ratio power trains including a one-way brake and a friction brake in series therewith for completing the power train, and a friction clutch for directly connecting said shafts exclusive of said converter to provide a direct drive between said shafts.

3. In a transmission, the combination of a drive shaft, a driven shaft, a hydraulic torque converter driven by said drive shaft, planetary gearing comprising two gear assemblies each including sun and ring gears and a pair of planet gears in mesh with each other, one of the planet gears of each gear assembly being in mesh with the sun gear of the assembly and the other planet gear of the assembly being in mesh with the ring gear of the assembly, means connecting said two sun gears, means connecting said planet gear carriers of said gear sets together and with said hydraulic torque converter to be driven thereby, means connecting the ring gear of one of said gear assemblies with said driven shaft and a brake for the other of said ring gears for completing a drive through the gearing and from said torque converter to said driven shaft.

4. In a transmission, the combination of a drive shaft, a driven shaft, a hydraulic torque converter driven by said drive shaft, a compound planet gear set including two gear sets each comprising sun and ring gears and a pair of planet gears in mesh with each other and a carrier for the planet gears of said gear set, one of the planet gears of each gear set being in mesh with the sun gear of the set and the other planet gear of the set being in mesh with the ring gear of the set, said sun gears of said two sets being connected together and said gear carriers of said two sets being connected together and to said torque converter to be driven thereby, one of said ring gears of one of said gear sets being connected with said driven shaft, a brake for the other of said ring gears for completing a low speed power train between said shafts and through said converter, a brake for said sun gears for completing an intermediate speed power train between said shafts and through said converter, and a clutch for connecting directly said drive and driven shafts.

5. In a transmission, the combination of a drive shaft, a driven shaft, a hydraulic torque converter driven by said drive shaft, compound planetary gearing comprising two gear sets, each of said sets including sun and ring gears and a pair of planet gears in mesh with each other and a planet gear carrier, one of the planet gears of each gear set being in mesh with the sun gear of the set and the other planet gear of the set being in mesh with the ring gear of the set, said sun gears of said sets being connected together and one of said ring gears being connected with said driven shaft, said carriers of said sets being connected together and with said torque converter as to be driven thereby, brake means for the other of said ring gears including a friction brake and a one-way engaging brake in series for providing a low speed drive between said shafts including said torque converter, brake means for said sun gears including a friction brake and a one-way engaging brake for providing an intermediate speed drive between said shafts including said torque converter, and a friction clutch for connecting directly said driving and driven shafts to provide a direct drive therebetween exclusive of said converter.

6. In a transmission, the combination of a drive shaft, a driven shaft, a hydraulic torque converter driven by said drive shaft and having an impeller, a stator, and a runner, a planetary gear set including a first, a second, a third and a fourth driving and drive receiving elements, said first element being connected with said runner, said second element constituting a reaction element, and said third element being connected with said driven shaft, said reaction element when braked completing a low speed power train between said shafts and through said torque converter and gear set, a brake for said reaction element, said fourth element constituting a reaction element for providing an intermediate speed power train between said shafts and through said torque converter and gear set when braked, a brake effective on said stator, and brake means effectively between said fourth element of said gear set and said last-named brake for completing an intermediate speed power train between said shafts and through said torque converter and planetary gear set, said brake means also being adapted when engaged to transmit a reverse drive from said stator through said gear set and to said driven shaft.

7. In a transmission, the combination of a drive shaft, a driven shaft, a hydraulic torque converter driven by said drive shaft, compound planetary gearing for connecting the converter and the driven shaft and including two planet gear assemblies, each assembly comprising a sun gear, a ring gear, a planet gear in mesh with the ring gear, a planet gear in mesh with the first-named planet gear and with the sun gear and a planet gear carrier, said converter comprising an impeller, a runner, and a stator, said gear carriers being connected with each other and also with said runner, one of said ring gears being connected with said driven shaft, a first brake for the other of said ring gears for completing a low speed drive between said shafts and through said torque converter and said planetary gearing, a second brake for said stator, and an engaging means for connecting said sun gears with said second brake and also with said stator whereby to provide an intermediate speed drive between said shafts and through said converter and gearing when both said second brake and said engaging means are engaged, and a third brake for said carrier for providing a reverse drive between said converter and said driven shaft when it and said engaging means are engaged.

References Cited in the file of this patent

UNITED STATES PATENTS

| Number | Name | Date |
|---|---|---|
| 2,146,369 | Dodge | Feb. 7, 1939 |
| 2,220,174 | Ravigneaux | Nov. 5, 1940 |
| 2,235,370 | Jandasek | Mar. 18, 1941 |
| 2,238,310 | Dodge | Apr. 15, 1941 |
| 2,302,714 | Pollard | Nov. 24, 1942 |
| 2,324,713 | McFarland | July 20, 1943 |
| 2,332,593 | Nutt | Oct. 26, 1943 |
| 2,351,554 | Simpson | June 13, 1944 |
| 2,372,817 | Dodge | Apr. 3, 1945 |
| 2,395,459 | Carnagua | Feb. 26, 1946 |
| 2,413,675 | Baker | Jan. 7, 1947 |
| 2,414,359 | Carnagua | Jan. 14, 1947 |
| 2,456,328 | Schneider | Dec. 14, 1948 |